Oct. 27, 1970  H. E. RADFORD  3,536,347
INTERMITTENT GEAR MEANS IN A KNOTTER
Filed Nov. 7, 1968                                    2 Sheets-Sheet 1

INVENTOR:
HERBERT EDWARD RADFORD
BY Kurt Kelman
AGENT

Oct. 27, 1970    H. E. RADFORD    3,536,347
INTERMITTENT GEAR MEANS IN A KNOTTER
Filed Nov. 7, 1968    2 Sheets-Sheet 2

INVENTOR:
HERBERT EDWARD RADFORD
BY Kurt Kelman
AGENT

United States Patent Office 3,536,347
Patented Oct. 27, 1970

3,536,347
INTERMITTENT GEAR MEANS IN A KNOTTER
Herbert Edward Radford, Uttoxeter, England, assignor to Bamfords Limited, Uttoxeter, England
Filed Nov. 7, 1968, Ser. No. 774,059
Claims priority, application Great Britain, Nov. 17, 1967, 52,421/67
Int. Cl. A01d 59/04
U.S. Cl. 289—2                                                                1 Claim

ABSTRACT OF THE DISCLOSURE

In a hay baler mechanism for operating the twine or wire tier in which the drive gear has an interrupted set of like gear teeth arranged to rotate a driven pinion, the first tooth of the driven pinion engaged by the other end flank of the end tooth of the interrupted set of gear teeth is of larger radius dimension than the other teeth thereby increasing its strength to avoid wear effects.

---

This invention relates to agricultural balers and is concerned in particular with the mechanism for operating intermittently the tying device for tying the formed bales, either by twine or wire.

The invention is to be applied to a mechanism which is of the kind comprising a rotatably mounted driving gear provided with an interrupted set of gear teeth engageable with the teeth of a driven pinion which is arranged to operate the bale tying mechanism or parts thereof, the arrangement being such that for each complete rotational movement of the driving gear, the driven pinion makes a single complete revolution to operate the bale typing mechanism or parts thereof.

For example, as applied to wire tiers, the driven pinion may serve to effect a complete rotational movement of a twister hook in the manner shown in our prior U.S. patent specification No. 3,102,466.

In mechanism of the above kind insofar as a complete revolution of the driven pinion is effected for each complete rotational movement of the driving gear, the same tooth on the driven pinion is always first engaged by the end tooth of the interrupted set of gear teeth provided on the driving gear.

As except during actual rotation of the driven pinion this is not in mesh with any of the teeth on the driving gear, when this one same tooth on the driven pinion is first engaged by the end tooth of the set of teeth on the driving gear there is always a certain impact at the start of the engagement leading to excessive wear of this first engaged tooth on the driven pinion, which usually fails by undue wear of this tooth long before any of the other teeth on the driven pinion have become unduly worn.

According to the present invention we provide in an agricultural baler mechanism for operating intermittently the tying device and embodying a rotatable driving gear, an interrupted act of like gear teeth provided on said driving gear, a rotatable driven pinion having teeth engageable with said interrupted set of gear teeth which effects a complete revolution of said driven pinion, and a tying mechanism operable by said driven pinion on said complete revolution thereof, the improvement of providing a first tooth on said driven pinion having a radius dimension greater than the other teeth of said driven pinion, said first tooth being engageable on each said revolution of said driven pinion by the outer face of the flank of the end tooth of said interrupted set of like gear teeth of said driving gear.

The effect of the foregoing is to provide greater metal in this first tooth of the driven pinion to allow for the effect of wear and also to increase the area of contact between the flank of this first tooth of the driven pinion and the flank of the end tooth of the interrupted set of teeth on the driving gear with which this one tooth on the driven pinion engages at the commencement of the rotational movement of the driven pinion.

Such increased area engagement between the two flanks of the end driving tooth and first driven tooth serves to reduce the pressure between the engaging flanks at the instant that the end tooth of the driving teeth first contacts the first tooth on the driven pinion, so as to assist still further in reducing wear.

Insofar as this first tooth on the driven pinion is not required to extend between the two teeth on the driving gear the radius dimension of this one tooth may be made greater than the depth of the valleys between adjacent teeth on the driving gear without fouling the driving gear in any way.

The effect of the foregoing is substantially to prolong the useful life of the driven pinion.

One preferred embodiment of the invention is illustrated in the accompanying drawings wherein.

Figure 1:
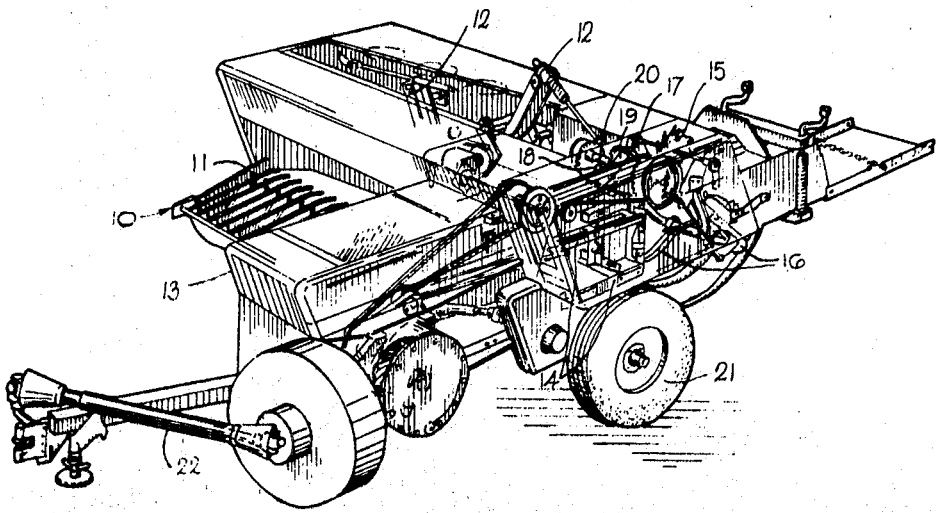
FIG. 1 is a perspective view of an agricultural baler embodying a twine tier modified in accordance with the invention.

With reference to the general view of FIG. 1, the hay baler includes a crop lifting reel assembly 10, having tines 11, transversely movable packer forks 12 and a baling chamber 13 with a reciprocatable plunger 14. The length of the bale is metered by a spiked wheel 15 and for casting, tying and knotting the twine, needles and needle yoke 16, twine fingers 17 and knotters 18 are provided and arranged to be driven by drive gear 19 on cross shaft 20.

The hay baler has wheels 21 to enable it to be advanced over the ground and power is provided from a tractor (not shown) through the power-take-off shaft 22.

In known manner the crop is lifted up from the ground by tines 11 and advanced by the reel assembly into the path of the packer forks 12 which deliver and pack the crop into the baling chamber 13 where it is compressed by the reciprocating plunger 14.

When the desired bale length is formed, the bale is tied by casting the twine around the bale by the needles and needle yoke 16 and knotted by knotters 18. Accordingly, the tying and knotting is an intermittent operation only occurring when a bale is completely formed.

Figure 2:
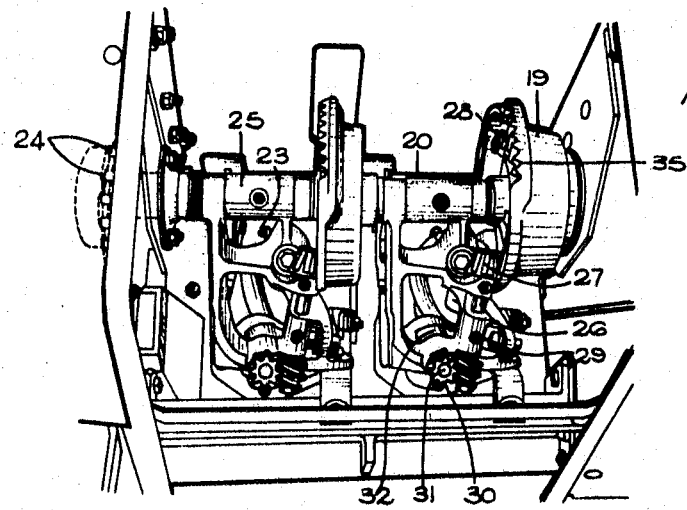
FIG. 2 is a front perspective view of the twine tier and knotter assembly of the baler of FIG. 1.
Figure 3:
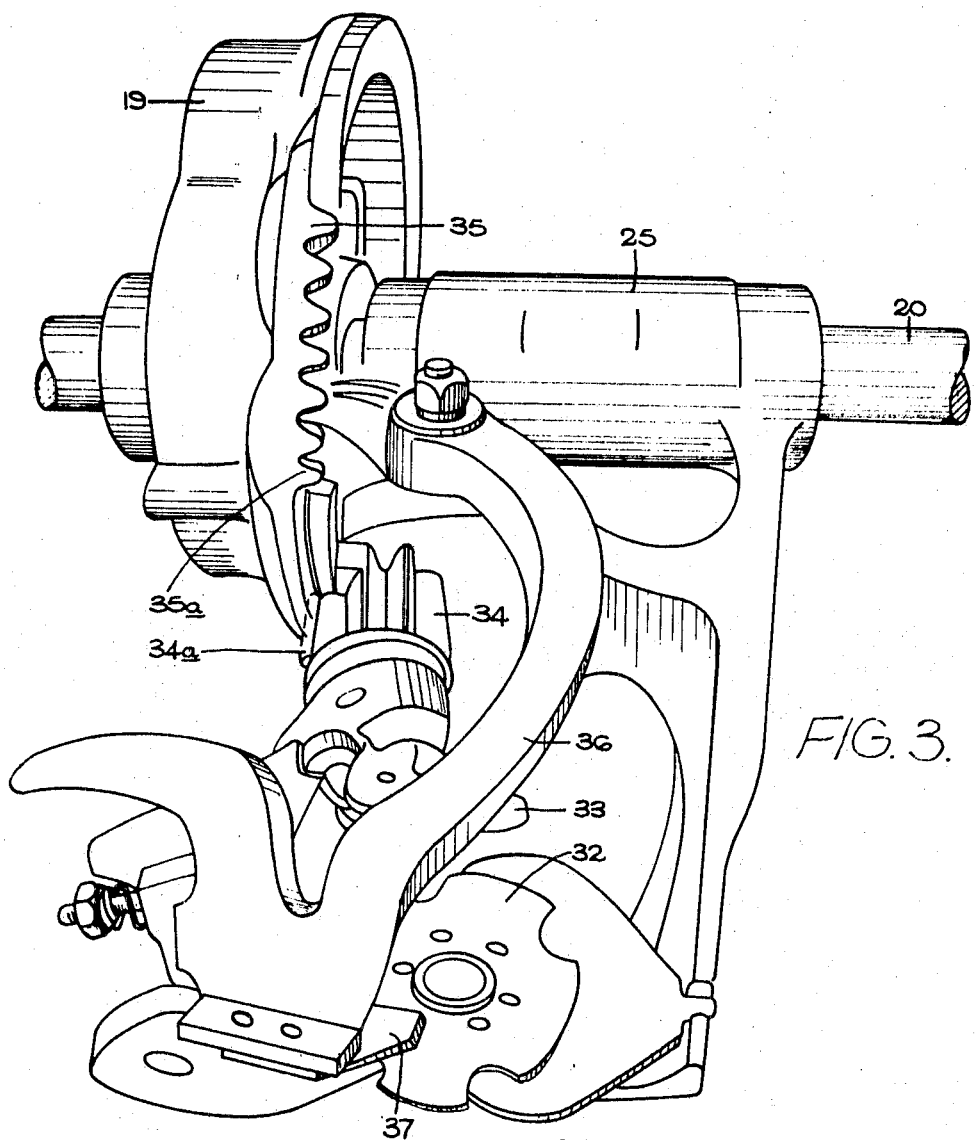
FIG. 3 is an enlarged rear perspective view of part of the assembly of FIG. 2.

With reference to FIGS. 2 and 3 the cross shaft 20 has a pair of driving gears 19 mounted thereon, each driving gear being arranged to drive one of a pair of knotter and tier mechanisms. The cross shaft 20 is rotated by a chain 23 engaging with sprocket 24 mounted on one end of the cross shaft 20.

Each knotter mechanism comprises a knotter frame 25 mounting a twine disc drive shaft 26 having at one end a bevel drive gear 27 engaging with an internal continuous set of gear teeth 28 on the driving gear 19.

The other end of drive shaft 26 has a worm 29 in meshing engagement with the twine disc drive gear 30 mounted on a shaft 31 which mounts the twine disc 32.

A knife arm 36 on which is mounted a knife 37 for cutting the twine is also mounted on the underside of knotter frame 25 a bill hook 33 is mounted for rotation and is driven by driven pinion 34 which is arranged to be rotated by the interrupted set of like gear teeth 35 provided on the driving gear 19.

The numbers of gear teeth in the interrupted set 35 and of gear teeth of the driving gear 34 are such that one complete revolution of the driven pinion 34 is effected by the engagement of the teeth of the interrupted set 35 during one complete revolution of the driving gear 19. Such complete revolution of the driven pinion 34 rotates the bill hook 33, and other parts of the tying and knotting mechanism as aforedescribed are also actuated by their driving engagement with the internal gear teeth 28 of driving gear 19, to effect the tying and knotting of the twine about a formed bale.

In each such complete revolution of the driven pinion 34 the outer face of the flank of end tooth 35a of the interrupted set of gear teeth 35 of the driving gear 19 always engages with the same tooth 34a, herein referred to as the first tooth, of the driven pinion 34.

Figure 4:
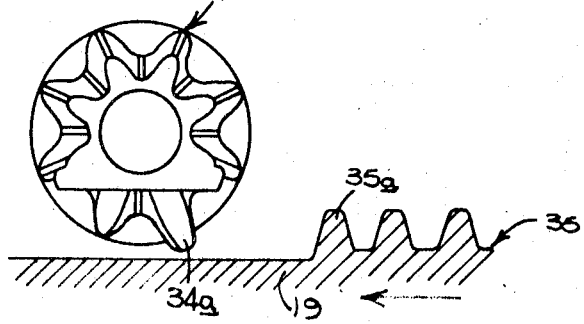
FIG. 4 is an enlarged end view of the driven pinion of the assembly of FIG. 3 schematically depicting the engagement of the driven pinion with the interrupted set of gear teeth on the driving gear.

As can best be seen from FIGS. 3 and 4 the first tooth 34a of the driven pinion is of a radius dimension greater than that of the remaining teeth. Although first tooth 34a is longer than the other teeth this does not interfere with the effective interengagement of the other teeth or driven pinion 34 with the interrupted set 35 of gear teeth on the driving gear 19, as this first tooth 34a does not have to extend between two teeth of the interrupted set 35, but only engages the outer face of the flank of end tooth 35a.

The foregoing improvement in the form of the teeth of the driven pinion 34 provides for a stronger first tooth which also allows for wear, and increases the area of contact between the flank of this first tooth and the outer flank of the end tooth of the interrupted set of gear teeth which serves to reduce the pressure between the engaging flanks.

What is claimed is:

1. In an agricultural baler mechanism for operating intermittently the tying device and embodying a rotatable driving gear, an interrupted set of like gear teeth provided on said driving gear, a rotatable driven pinion having teeth engageable with said interrupted set of gear teeth which effects a complete revolution of said driven pinion, and a tying mechanism operable by said driven pinion on said complete revolution thereof, the improvement of providing a first tooth on said driven pinion having a radius dimension greater than the other teeth of said driven pinion, said first tooth being engageable on each said revolution of said driven pinion by the outer face of the flank of the end tooth of said interrupted set of like gear teeth of said driving gear.

References Cited

UNITED STATES PATENTS 3,168,342   2/1965   Harper _____ 289—2

LOUIS K. RIMRODT, Primary Examiner

U.S. Cl. X.R.

74—437